United States Patent [19]

Uesugi et al.

[11] Patent Number: 4,520,230

[45] Date of Patent: May 28, 1985

[54] CROSS-LINKED POLYETHYLENE INSULATED POWER CABLE WITH IMPROVED ELECTRIC BREAKDOWN STRENGTH AND METHOD FOR MANUFACTURING THE SAME

[75] Inventors: Kenji Uesugi, Yotsukaido; Shin-ichi Irie, Ichihara; Yoshihisa Asada, Chiba; Masahiro Maeda, Yokohama; Nobuyuki Yamada, Chiba; Hideaki Nakagawa, Suzuka, all of Japan

[73] Assignees: The Furukawa Electric Co., Ltd.; Mitsubishi Petrochemical Company Limited, both of Tokyo, Japan

[21] Appl. No.: 523,895

[22] Filed: Aug. 15, 1983

Related U.S. Application Data

[63] Continuation of Ser. No. 262,908, May 12, 1981, abandoned.

[30] Foreign Application Priority Data

May 21, 1980 [JP] Japan .................................. 55-66371
May 23, 1980 [JP] Japan .................................. 55-68643
May 26, 1980 [JP] Japan .................................. 55-69008

[51] Int. Cl.³ ....................... B32B 15/00; B32B 27/00; H01B 7/00

[52] U.S. Cl. ............................ 174/107; 174/110 PM; 174/120 SR; 174/120 SC; 428/379; 428/383

[58] Field of Search ............... 428/375, 379, 383, 368, 428/372; 174/120 SC, 120 SR, 110 PM, 105 SC, 174/106 SC, 107; 525/333.7, 333.8, 333.9

[56] References Cited

U.S. PATENT DOCUMENTS

| | | | |
|---|---|---|---|
| 3,375,303 | 3/1968 | Joyce | 174/110 PM |
| 3,441,660 | 4/1969 | Garner | 174/110 PM |
| 3,482,033 | 12/1969 | Kenney et al. | 174/110 PM |
| 4,129,552 | 12/1978 | Galaj et al. | 174/110 PM |

FOREIGN PATENT DOCUMENTS

| | | | |
|---|---|---|---|
| 53-11674 | 4/1978 | Japan | 174/110 PM |
| 1108762 | 4/1968 | United Kingdom | 174/120 SC |

*Primary Examiner*—Lorraine T. Kendell
*Attorney, Agent, or Firm*—Frishauf, Holtz, Goodman & Woodward

[57] ABSTRACT

There are disclosed a cross-linked polyethylene insulated power cable with improved electric breakdown strength having a conductor covered with a cross-linked polyethylene insulating layer having a density of 0.918 g/cm³ or more, a crystal thickness of 76 Å or more, and a gel fraction of 60% or more; and a method for manufacturing such a power cable.

7 Claims, 2 Drawing Figures

CROSS-LINKED POLYETHYLENE INSULATED POWER CABLE WITH IMPROVED ELECTRIC BREAKDOWN STRENGTH AND METHOD FOR MANUFACTURING THE SAME

This application is a continuation of application Ser. No. 262,908, filed May 12, 1981, now abandoned.

The present invention relates to a cross-linked polyethylene insulated power cable having improved electric breakdown strength, particularly at high temperatures, and a method for manufacturing the same.

The demand for cross-linked polyethylene insulated power cable has increased rapidly because of its excellent electrical and mechanical properties. At present, cross-linked polyethylene insulated power cable in grades of up to 66 kV are being widely used, and moreover 275 kV-grade cables are in practical use.

However, such a prior art cross-linked polyethylene insulated cable is disadvantageous in that the dielectric breakdown strength of the insulation becomes extremely low at high temperature as compared to that at room temperature, limiting the field of application. For example, there is a cross-linked polyethylene insulated power cable with which the impulse breakdown strength at the working temperature (90° C.) decreases to about 70% of that obtained at room temperature (20° C.).

For this reason, even when a power cable of materials having a relatively high breakdown strength at room temperature is used, the insulation must be made thicker than necessary for use at room temperature, taking into consideration the rise of temperature of the conductor under the normal working condition of the power cable.

The present inventors have made extensive studies on the above problem, that is, the reduction in the breakdown strength of the insulation of the above-mentioned cross-linked polyethylene insulated power cable at higher temperatures. As a result of these studies, it has been found that the crystal structure of the cross-linked polyethylene is significantly related to the electrical characteristics. As a result of further studies made on this finding, it has been found that the problem of reduction of the impulse breakdown strength can be significantly improved by forming the insulation of a cross-linked polyethylene insulated power cable with a particular type of cross-linked polyethylene having a density of 0.918 g/cm$^3$ or more, a crystal thickness of 76 Å or more, and a gel fraction of 60% or more.

The reason why the cross-linked polyethylene insulated power cable according to the present invention solves the above-mentioned problem is considered to be as follows.

The impulse characteristics of the cross-linked polyethylene used as the insulation according to the present invention are closely related to the density, the crystal thickness, and the gel fraction. When these characteristics are defined as described above, the reduction in the impulse breakdown strength of the cross-linked polyethylene insulated power cable according to the present invention at high temperatures is reduced to the minimum.

When the density of the cross-linked polyethylene of the insulation is 0.918 g/cm$^3$ or more and the crystal thickness thereof is 76 Å or more, this cross-linked polyethylene tends to retain its crystalline condition. As a result of this, electrons activated at high temperatures collide more frequently with the crystalline phase, thereby reducing the energy posessed by the electrons and preventing the reduction of the impulse breakdown strength.

When the gel fraction of this cross-linked polyethylene is at least 60%, the mechanical and physical characteristics of the insulation at high temperatures are better than the standard characteristics. This is also considered to contribute to the prevention of the reduction of the impulse breakdown strength of the cross-linked polyethylene at high temperatures.

Thus, the effects obtainable with the present invention are considered to be attributable to the combined effects of the density of the cross-linked polyethylene used for the insulation, the crystal thickness thereof, and the gel fraction thereof being within the ranges defined above.

In fact, with the cross-linked polyethylene insulated power cable according to the present invention, the impulse breakdown strength when the temperature is raised from room temperature to 90° C. is maintained at 80% or more of that obtained at room temperature, which is significantly better than the 70% obtained with the prior art cable.

This invention can be more fully understood from the following detailed description when taken in conjunction with the accompanying drawings, in which.

Figure 1:
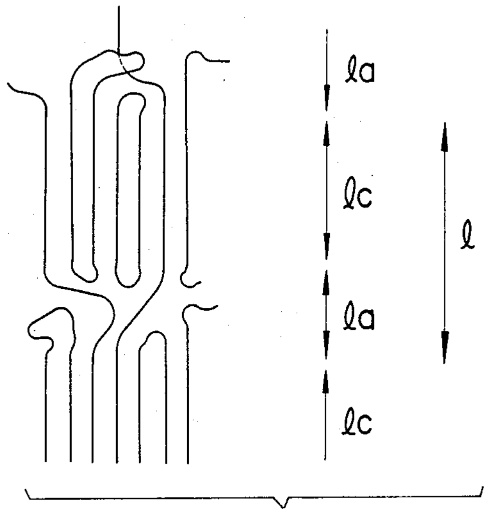
FIG. 1 shows a model of the crystal structure of polyethylene.

As a result of further studies, it has been found that a cross-linked polyethylene insulated power cable as described above may be prepared by extrusion-coating a cross-linkable polyethylene composition on a conductor and thereafter heating the composition under pressure to effect cross-linking, said cross-linkable polyethylene composition being prepared by adding a chemical cross-linking agent to a raw material polyethylene having a density of 0.925 g/cm$^3$ or more and a crystal thickness of 90 Å or more; or by adding, to a raw material polyethylene having a density between 0.920 g/cm$^3$, inclusive and 0.925 g/cm$^3$, not inclusive and a crystal thickness of 80 Å or more, a chemical cross-linking agent and at least 0.3 part by weight of dibenzylidene-D-sorbitol based on 100 parts by weight of the latter polyethylene. The density and the crystal thickness of the raw material polyethylene are specifically limited according to the method of the present invention for the reasons to be described below. When the density of the raw material polyethylene is less than 0.925 g/cm$^3$ and the crystal thickness is less than 90 Å, the crystallization of the cross-linked polyethylene is extremely impaired when it is desired to obtain a gel fraction of 60% or more during manufacture of the power cable. In this case, it is impossible to prepare a cross-linked polyethylene having a density of 0.918 g/cm$^3$ or more and a crystal thickness of 76 Å or more which exhibits excellent electric breakdown strength at high temperatures. However, when the raw material polyethylene has a density between 0.920 g/cm$^3$, inclusive and 0.925 g/cm$^3$, not inclusive and a crystal thickness of at least 80 Å, it is possible to obtain also from this raw material polyethylene, by adding at least 0.3 part by weight of dibenzylidene-D-sorbitol to 100 parts by weight of said polyethylene, a cross-linked polyethylene having excellent electric breakdown strength at high temperatures comparable to those of the cross-linked polyethylene obtained from a raw material polyethylene having a density of 0.925 g/cm$^3$ or more and a crystal thickness of 90 Å or more. However, when the crystal thickness of the raw material polyethylene exceeds 120 Å, scorching (early cross-linking) becomes extreme when extrusion-coating the cross-linkable polyethylene composition using this raw material polyethylene on a conductor, resulting in difficult extrusion.

The crystal thickness (lc) in this invention refers to the two-phase model of high molecular crystal structure (see note below) and is obtained by, for example as in a model of the crystal structure in FIG. 1, multiplying together the long period (length of the repeating unit of the crystal and noncrystal parts) (l) measured by small-angle X-ray scattering, and the degree of crystallization (Xv) (volumetric ratio of the crystal part). S. Kavesh and J. M. Schultz, "Lameller and Interlameller Structure in Melt Crystallized Polyethylene, II Lameller Spacing, Interlameller Thickness, Interlameller Density and Sacking Disorder" Journal of Polymer Science: Part A-2, Vol. 9, No. 1, PP 85–114, 1971.

The small-angle X-ray scattering described above is measured by a scintillation counter with X-rays of 1.54 Å wavelength (λ). Lorentz correction is performed for the scattering intensity. The long period (l) is obtained by substituting the scattering angle ($2\theta_{peak}$) respresenting the peak intensity into the Bragg formula of equation (1) below:

$$2l\cdot\sin\theta_{peak}=\lambda \quad (1)$$

where $\theta_{peak}$=half the value of the scattering angle ($2\theta_{peak}$)

λ=wavelength 15.4 Å of the X-rays

The crystal thickness (lc) and the noncrystal thickness (la) are obtained in equations (2) and (3) by applying the two-phase model of FIG. 1:

$$lc=Xv\cdot l \quad (2)$$

$$la=(1-Xv)\cdot l \quad (3)$$

where Xv=degree of crystallinity represented by the volumetric ratio given by the following equation (4):

$$Xv=lc/(lc+la)=lc/l \quad (4)$$

For measuring the above-mentioned values according to the present invention, a 1 mm-thick sample sheet of the raw material polyethylene was formed by a press at 160° C. and cooled at the rate of about 30° C./min. The sample for the cross-linked polyethylene was a sheet cut out of insulating layer in the direction of the thickness (radial direction) to a thickness of about 1 mm. The crystal thickness of the cross-linked polyethylene was measured by scanning along the longitudinal direction of the cable with a scintillation counter while irradiating the insulating layer with X-rays in the direction of thickness (radial direction).

The density was measured by a density gradient tube according to JIS (Japanese Industrial Standard) K6760, and the gel fraction was measured according to JIS C3005.

The raw material polyethylene which is used in the present invention may be manufactured by the following methods: the high pressure polymerization method, the medium pressure polymerization method, and the low pressure polymerization method. A mixture of two or three kinds of the above polyethylene may be used as the raw material polyethylene. However, it is preferable to use a polyethylene which is obtained by the high pressure polymerization method, since less scorching occurs during the extrusion-coating.

It is particularly preferable to use a raw material polyethylene which has a density of 0.927 g/cm$^3$ or more and a crystal thickness of 95 to 110 Å. If the density of the raw material polyethylene is too high, the cross-linking rate and the gel fraction of the final cross-linked polyethylene are decreased. Therefore, in order to counterpart such phenomena, it is preferable that the molecular-weight distribution index $\overline{Mw}/\overline{Mn}$ of the raw material polyethylene is 8 or less as measured by GPC (gel permeation chromatography).

The MFR (melt flow rate) of this raw material polyethylene is 0.3 to 4 g/10 min and, preferably 0.5 to 2 g/10 min. This is because a MFR of less than 0.3 tends to result in sorching during extrusion-coating, and a MFR of more than 4 tends to result in a decrease in the gel fraction of the cross-linked polyethylene.

The chemical cross-linking agent used in the present invention may include organic peroxides such as dicumyl peroxide, t-butyl cumyl peroxide, 2,5-dimethyl-2,5-di(t-butylperoxy)hexyne, and 2,5-dimethyl-2,5-di(t-butylperoxy)hexene. The chemical cross-linking agent is added to the raw material polyethylene in an amount of 0.5 to 4.0 parts by weight, preferably 1.0 to 3.0 parts by weight based on 100 parts by weight of the raw material polyethylene. Dibenzylidene-D-sorbitol must be added in an amount of 0.3 part by weight or more based on 100 parts by weight of the raw material polyethylene. However, since a large amount of it does not provide significantly better results, it is preferable in practice to keep it within the range of 0.3 to 1.0 parts by weight.

To the cross-linkable polyethylene composition used in the present invention may be added, as required, suitable amounts of an antioxidant, a voltage stabilizing agent, a copper inhibitor, carbon black, a filler and so on, which are normally used.

The method for mixing the raw material polyethylene, the chemical cross-linking agent, the bibenzylidene-D-sorbitol, and the other suitable additives described above may include simultaneous melting kneading using a Banbury mixer, a roll mill, an extruder or the like; a method for impregnating solid polyethylene pellet or granule with the cross-linking agent and additivies in a melted state; a method of diluting with the raw material polyethylene a master batch consisting of the cross-linking agent and the additives and preparing the composition by an extruder or the like; a method of directly extruding a mixture of the master batch with the raw material polyethylene; and so on.

For manufacturing a cross-linked polyethylene insulated power cable from the cross-linkable polyethylene composition according to the present invention, the conventional cross-linking method may be adopted according to which the cross-linkable polyethylene composition is extrusion-coated on the conductor with an extruder and thereafter heated under pressure by the wet or dry cross-linking method. The cross-linking method may preferably be a dry cross-linking process such as the cross-linking process in the long land die, the thermal radiation cross-linking process, the inert gas cross-linking process, the molten metal salt cross-linking process, the ultrasonic cross-linking process and so on. The electric breakdown strength of the resultant cross-linked polyethylene may further be improved by maintaining a temperature gradient along the longitudinal direction of the cooling tube during the cooling process after cross-linking, to thereby control the cooling rate of the insulation immediately on the conductor at temperature near the crystallization temperature of the cross-linked polyethylene to be 10° C./min or less. In the manufacturing method described above, the electric breakdown strength of the resultant cross-linked polyethylene at high temperatures may further be improved by suitably selecting the forming conditions so that the cross-linked polyethylene has a degree of orientation of 100 CPS as measured by wide angle X-ray diffraction during extrusion-coating of the cross-linkable polyethylene composition. This is accomplished, for example, by increasing the drawdown during extrusion-coating. The degree of orientation of the cross-linked polyethylene according to the wide angle X-ray diffraction method is obtained by measuring the intensity distribution of a sample (intensity distribution in azimuth direction) while fixing a detector at diffraction angle ($2\theta_{110}$) while rotating the sample and subtracting the background reading from the maximum value in the intensity distribution.

As may be seen from the examples to be described below, the present invention provides a cross-linked polyethylene insulated power cable with which the reduction of the dielectric breakdown strength at high temperatures is significantly improved by using the particular cross-linked polyethylene constituting the insulation as defined hereinabove. The industrial application of the present invention is promising.

Examples and comparative examples of the present invention will now be described.

EXAMPLES 1 TO 7 AND COMPARATIVE EXAMPLES 1 to 5

Figure 2:
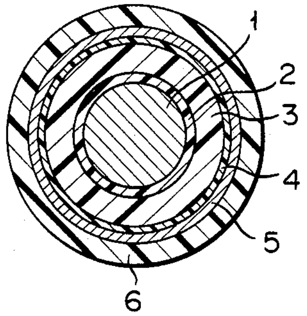
FIG. 2 is a sectional view of a cross-linked polyethylene insulated power cable according to an example of the present invention.

A copper strand wire 1 having a cross-sectional area of 250 mm² as shown in FIG. 2 was sequentially coated by extrusion at a temperature of 120° C. with a 1 mm-thick internal semiconducting layer 2 comprising a semiconducting polyethylene composition, a 11 mm-thick insulating layer 3 comprising a cross-linkable polyethylene composition as shown in Table 1, and a 0.5 mm-thick outer semiconducting layer 4 comprising a semiconducting polyethylene composition. This coated cable was passed at a rate of 2 m/min through a long die heated to 250° C. for heating and cross-linking and was cooled in a cooling tube divided into three zones. The first zone of the cooling tube was kept at room temperature, the second zone thereof was heated to 150° C., and the third zone thereof was heated to 100° C. Through each of these zones was passed unheated $N_2$ gas at a rate of 10 m/min. The drawdown of the cross-linkable polyethylene composition during formation of the insulating layer by extrusion-coating as kept at 0%.

On the outer semiconducting layer of each cable thus obtained were sequentially coated a 0.6 mm-thick shielding layer 5 comprising copper tape, and a 4.0 mm-thick sheath layer 6 comprising a polyvinyl chloride composition, to provide a cross-linked polyethylene insulated power cable of 66 kV rating. Each resultant cross-linked polyethylene insulated power cable was tested for the solid structure of the cross-linked polyethylene constituting the insulating layer, the gel function thereof and the impulse breakdown strength at room temperature and at 90° C. The results obtained are shown in Table 1 below.

For measuring the impulse breakdown strength, a negative standard impulse voltage was used. After a starting voltage of 400 kV is applied three times for each, the voltage was stepped up in 10 kV increments by applying each incremented voltage three times. The voltage at which impulse breakdown occurred was measured.

The values shown in Table 1 are the typical values obtained by calculating a 63% breakdown probability voltage according to the Weibull distribution from the values obtained with 10 samples of each example and comparative example.

TABLE 1

| | | Comparative Example 1 | Comparative Example 2 | Example 1 | Example 2 | Example 3 | Example 4 | Example 5 | Example 6 | Example 7 | Comparative Example 3 | Comparative Example 4 | Comparative Example 5 |
|---|---|---|---|---|---|---|---|---|---|---|---|---|---|
| Raw Material | Density (g/cm³) | 0.920 | 0.922 | 0.925 | 0.925 | 0.925 | 0.925 | 0.927 | 0.930 | 0.930 | 0.930 | 0.932 | 0.945 |
| | Crystal Thickness (Å) | 80 | 84 | 90 | 90 | 90 | 90 | 95 | 100 | 115 | 100 | 125 | 150 |
| Polyethylene | $\overline{Mw}/\overline{Mn}$ | 15 | 8 | 8 | 11 | 8 | 8 | 6 | 6 | 4 | 6 | 4 | 4 |
| | MFR (g/10 min) | 1 | 1 | 1 | 1 | 0.2 | 6 | 1 | 1 | 2 | 1 | 2 | 4 |
| | Polymerization Method | High Pressure | High Pressure | High Pressure | High Pressure | High Pressure | High Pressure | High Pressure | High Pressure | Medium Pressure | High Pressure | Medium Pressure | Low Pressure |
| Cross-linkable Composition | Polyethylene (Parts By Weight) | 100 | 100 | 100 | 100 | 100 | 100 | 100 | 100 | 100 | 100 | 100 | 100 |
| | Dicumyl Peroxide (Parts By Weight) | 2.0 | 2.0 | 2.0 | 2.0 | 2.0 | 2.0 | 2.0 | 2.0 | 2.0 | 0.4 | 2.0 | 2.0 |
| | Antioxidant (Parts By Weight) | 0.3 | 0.3 | 0.3 | 0.3 | 0.3 | 0.3 | 0.3 | 0.3 | 0.3 | 0.3 | 0.3 | 0.3 |
| Manufacture of Power Cable | Extrudability of Composition | Good | Good | Good | Good | Fair | Good | Good | Good | Fair | Good | Poor | Poor |
| | Cooling Rate of Cross-linked Polyethylene Insulation at Temperature Near Crystallization Temperature (°C./min) | 15 | 15 | 15 | 15 | 15 | 15 | 15 | 15 | 15 | 15 | — | — |
| Cross- | Density (g/cm³) | 0.915 | 0.916 | 0.918 | 0.920 | 0.920 | 0.920 | 0.923 | 0.926 | 0.925 | 0.928 | — | — |

TABLE 1-continued

| | | Comparative Example 1 | Comparative Example 2 | Example 1 | Example 2 | Example 3 | Example 4 | Example 5 | Example 6 | Example 7 | Comparative Example 3 | Comparative Example 4 | Comparative Example 5 |
|---|---|---|---|---|---|---|---|---|---|---|---|---|---|
| linked Polyethylene | Crystal Thickness (Å) | 68 | 69 | 78 | 82 | 81 | 80 | 85 | 92 | 108 | 96 | — | — |
| | Gel Fraction (%) | 84 | 83 | 84 | 67 | 84 | 65 | 80 | 75 | 80 | 50 | — | — |
| Power Cable | Impulse Breakdown Strength at Room Temperature (kV) | 1120 | 1140 | 1180 | 1190 | 1190 | 1180 | 1200 | 1250 | 1270 | 1250 | — | — |
| | Impulse Breakdown Strength at 90° C. (kV) | 820 | 800 | 1080 | 1070 | 1090 | 950 | 1100 | 1140 | 1150 | 800 | — | — |
| | Strength at 90° C./Strength at Room Temperature (%) | 73.2 | 70.2 | 91.5 | 89.9 | 91.6 | 80.5 | 91.7 | 91.2 | 90.5 | 64.0 | — | — |

EXAMPLES 8 TO 12 AND COMPARATIVE EXAMPLES 6 AND 7

Cross-linked polyethylene insulated power cables of 66 kV rating were manufactured in a manner similar to Example 1 except that the composition shown in Table 2 was used for the cross-linkable polyethylene composition for forming the insulating layer.

Each cross-linked polyethylene insulated power cable so made was tested as in Example 1 for the solid structure of the cross-linked polyethylene forming the insulating layer, the gel fraction thereof, and the impulse breakdown strength at room temperature and at 90° C. The results obtained are shown in Table 2.

As may be apparent from the table, although the density of the raw material polyethylene was 0.920 g/cm$^3$ and the crystal thickness thereof was 80 Å or the density of the raw material polyethylene was 0.923 g/cm$^3$ and the crystal thickness thereof was 84 Å, for example, the cross-linked polyethylene exhibited excellent electric breakdown strength at high temperatures when at least 0.3 part by weight of dibenzylidene-D-sorbitol (DBS) was added to 100 parts by weight of the raw material polyethylene.

TABLE 2

| | | Example 8 | Comparative Example 6 | Comparative Example 7 | Example 9 | Example 10 | Example 11 | Example 12 |
|---|---|---|---|---|---|---|---|---|
| Raw Material | Density (g/cm$^3$) | 0.920 | 0.923 | 0.923 | 0.923 | 0.923 | 0.923 | 0.923 |
| | Crystal Thickness (Å) | 80 | 84 | 84 | 84 | 85 | 84 | 84 |
| Polyethylene | $\overline{Mw}/\overline{Mn}$ | 15 | 8 | 8 | 8 | 12 | 8 | 8 |
| | MFR (g/10 min) | 1 | 1 | 1 | 1 | 1 | 1 | 1 |
| | Polymerization Method | High Pressure | High Pressure | High Pressure | High Pressure | High Pressure | High Pressure | High Pressure |
| Cross-linkable Composition | Polyethylene (Parts By Weight) | 100 | 100 | 100 | 100 | 100 | 100 | 100 |
| | Dicumyl Peroxide (Parts By Weight) | 2.0 | 2.0 | 2.0 | 2.0 | 2.0 | 2.0 | 2.0 |
| | Antioxidant (Parts By Weight) | 0.3 | 0.3 | 0.3 | 0.3 | 0.3 | 0.3 | 0.3 |
| | DBS (Parts by weight) | 0.5 | 0 | 0.2 | 0.5 | 0.5 | 0.8 | 1.2 |
| Manufacture of Power Cable | Extrudability of Composition | Good | Good | Good | Good | Good | Good | Good |
| | Cooling Rate of Cross-linked Polyethylene Insulation at Temperature Near Crystallization Temperature (°C./min) | 15 | 15 | 15 | 15 | 15 | 15 | 15 |
| Cross-linked Polyethylene | Density (g/cm$^3$) | 0.918 | 0.917 | 0.918 | 0.920 | 0.920 | 0.921 | 0.922 |
| | Crystal Thickness (Å) | 81 | 70 | 75 | 84 | 84 | 85 | 86 |
| | Gel Fraction (%) | 84 | 80 | 80 | 80 | 68 | 80 | 80 |
| Power Cable | Impulse Breakdown Strength at Room Temperature (kV) | 1140 | 1140 | 1160 | 1220 | 1220 | 1220 | 1230 |
| | Impulse Breakdown Strength at 90° C. (kV) | 940 | 820 | 900 | 1130 | 1020 | 1130 | 1140 |
| | Strength at 90° C./Strength at Room Temperature (%) | 82.5 | 72.0 | 77.6 | 92.6 | 83.6 | 92.6 | 92.7 |

EXAMPLES 13 AND 14

Cross-linked polyethylene insulated power cables of 66 kV rating were manufactured in a manner similar to Example 1 except that the cooling rate at temperature near the crystallization temperature of the cross-linked polyethylene during the cooling process was 10° C./min and 5° C./min instead of the normal rate of 15° C./min using, as the cross-linkable polyethylene composition for forming the insulating layer, the cross-linkable polyethylene composition of Example 6 (Example 13) and the cross-linkable polyethylene composition of Example 9 (Example 14).

The resultant cross-linked polyethylene insulated power cables were tested for the solid structure of the cross-linked polyethylene forming the insulating layer, the gel fraction thereof, and the impulse breakdown strength at room temperature and at 90° C. The results obtained are shown in Table 3 below.

As may be apparent from the table, the impulse breakdown strength of the cross-linked polyethylene insulating layer at high temperatures may be improved by controlling the cooling rate of the cross-linked polyethylene to be 10° C./min or less at temperature near the crystallizing temperature during the cooling process after the cross-linking.

TABLE 3

| | | Example 13 | | | Example 14 | | |
|---|---|---|---|---|---|---|---|
| Manufacture of Power Cable | Cooling Rate of Cross-linked Polyethylene Insulation at Temperature Near Crystallization Temperature (°C./min) | 15 | 10 | 5 | 15 | 10 | 5 |
| Cross-linked Polyethylene | Density (g/cm$^3$) | 0.926 | 0.927 | 0.928 | 0.920 | 0.921 | 0.921 |
| | Crystal Thickness (Å) | 92 | 94 | 95 | 84 | 85 | 86 |
| | Gel Fraction (%) | 75 | 77 | 79 | 80 | 80 | 80 |
| Power Cable | Impulse Breakdown Strength at Room Temperature (kV) | 1250 | 1290 | 1310 | 1220 | 1230 | 1230 |
| | Impulse Breakdown Strength at 90° C. (kV) | 1140 | 1170 | 1190 | 1130 | 1130 | 1140 |
| | Strength at 90° C./Strength at Room Temperature (%) | 91.2 | 90.7 | 90.8 | 92.6 | 91.8 | 92.7 |

EXAMPLE 15

A copper strand wire having a cross-sectional area of 250 mm$^2$ was sequentially coated by extrusion at a temperature of 120° C. with a 1 mm-thick internal semiconducting layer comprising a semiconducting polyethylene composition, a 11 mm-thick insulating layer comprising the cross-linkable polyethylene composition used in Example 6, and a 0.5 mm-thick outer semiconducting layer comprising a semiconducting polyethylene composition. The coated cable was then passed through a cross-linking tube at a rate of 2 m/min for heating and cross-linking, the tube using a molten metal salt, as the heating medium, heated to 230° C. under a pressure of 10 kg/cm$^2$ . The cable was thereafter cooled. The drawdown of the cross-linkable polyethylene composition during formation of the insulating layer by extrusion-coating was 30%.

The outer semiconducting layer of the cable was further covered with a 0.6 mm-thick shielding layer comprising copper tape, and a 4.0 mm-thick sheath layer comprising a polyvinyl chloride composition, in the order named, to provide cross-linked polyethylene insulated power cables of 66 kV rating.

For comparison, cross-linked polyethylene insulated power cables of the same structure were manufactured by controlling the drawdown of the cross-linkable polyethylene composition during extrusion-coating to be 0%. The cross-linked polyethylene forming the insulating layer of the resultant cross-linked polyethylene insulated power cables was tested for solid structure, gel fraction, and impulse breakdown strength at room temperature and at 90° C. The results obtained are shown in Table 4.

As may be seen from the table, the impulse breakdown strength of the cross-linked polyethylene insulating layer may be further improved by controlling the drawdown of the cross-linkable polyethylene composition during extrusion-coating to thereby make the degree of orientation of the cross-linked polyethylene 100 CPS or more.

TABLE 4

| | | Example 15 | |
|---|---|---|---|
| Manufacture of Power Cable | Drawdown of Extruded Composition | 0 | 30 |
| | Cooling Rate of Cross-linked Polyethylene Insulation at Temperature Near Crystallization Temperature (°C./min) | 15 | 15 |
| Cross-linked Polyethylene | Density (g/cm$^3$) | 0.926 | 0.927 |
| | Crystal Thickness (Å) | 92 | 95 |
| | Degree of Orientation (CPS)* | 60 | 110 |
| | Gel Fraction (%) | 75 | 76 |
| Power Cable | Impulse Breakdown Strength at Room Temperature (kV) | 1250 | 1330 |
| | Impulse Breakdown Strength at 90° C. (kV) | 1140 | 1220 |
| | Strength at 90° C./Strength at Room Temperature (%) | 91.2 | 91.7 |

*CPS = counter per second

What is claimed is:

1. A cross-linked polyethylene insulated power cable with improved electric breakdown strength, comprising an elongated conductor and an insulating layer of cross-linked polyethylene surrounding said conductor, said cross-linked polyethylene having a density of 0.918 g/cm$^3$ or more, a crystal thickness of 76 Å or more and a gel fraction of 60% or more, the ratio of the impulse breakdown strength of said cross-linked polyethylene at 90° C. to the impulse breakdown strength at room temperature being at least 80%.

2. The cross-linked polyethylene insulated power cable with improved electric breakdown strength according to claim 1, wherein the cross-linked polyethylene has a degree of orientation of 100 CPS or more as measured by the wide angle X-ray diffraction method.

3. The cross-linked polyethylene insulated power cable with improved electric breakdown strength according to claim 1, wherein the cross-linked polyethylene has a crystal thickness of 76 Å to 108 Å.

4. The cross-linked polyethylene insulated power cable with improved electric breakdown stength according to claim 1, wherein the cross-linked polyethylene has a density of 0.918 $g/cm^3$ to 0.928 $g/cm^3$.

5. The cross-linked polyethylene insulated ·power cable with improved electric breakdown strength according to claim 1, wherein the cross-linked polyethylene has a gel fraction of 60% to 84%.

6. The cross-linked polyethylene insulated power cable with improved electric breakdown strength according to claim 3, wherein the cross-linked polyethylene has a density of 0.918 $g/cm^3$ to 0.928 $g/cm^3$; wherein the cross-linked polyethylene has a gel fraction of 60% to 84%; and wherein said cross-linked polyethylene has a degree of orientation of 100 CPS or more as measured by the wide angle X-ray diffraction method.

7. The cross-linked polyethylene insulated power cable with improved electric breakdown strength according to claim 1 further comprising:

an internal semiconducting layer formed between said elongated conductor and said insulating layer; and outer layers sequentially formed on the outside of said insulating layer, said outer layers comprising an outer semiconducting layer in direct contact with the outside of said insulating layer, a metal shielding layer formed on the outer surface of said outer semiconducting layer, and a sheath layer formed on the outer surface of said metal shielding layer.

* * * * *